July 29, 1941.  R. URTEL  2,250,686
SAW-TOOTH WAVE OSCILLATOR
Filed Sept. 17, 1938

INVENTOR
RUDOLF URTEL
BY H. S. Grover
ATTORNEY

Patented July 29, 1941

2,250,686

UNITED STATES PATENT OFFICE 2,250,686

SAW-TOOTH WAVE OSCILLATOR

Rudolf Urtel, Berlin, Germany, assignor to Telefunken Gesellschaft für Drahtlose Telegraphie m. b. H., Berlin, Germany, a corporation of Germany Application September 17, 1938, Serial No. 230,365
In Germany June 17, 1937

3 Claims. (Cl. 250—36)

To generate a sawtooth wave a circuit organization has been disclosed in the earlier art in which potential feedback or regenerative relationship is established between a controlled tube and a parallel resonance circuit whose inductance branch includes a rectifier. According to the said disclosure this sawtooth generator is to be used for supplying sawtooth waves for time-base or cathode ray pencil deflection in that to the sawtooth potential arising between the filament and the plate of the controlled tube a deflector coil is capacitively coupled.

The present invention more particularly has the aim to produce a so-called symmetric sawtooth potential wave with a sawtooth or time-base generator of the suggested type. What is meant are two potentials which vary in opposition or in opposite senses and which therefore are directly adapted to the operation of a cathode ray tube with plate deflection means, without the use of a push-pull amplifier.

Before entering more fully in the modifications of the above earlier circuit organization as suggested in the present invention, the layout and the operation of a circuit arrangement as known in the earlier art shall be discussed once more.

Figure 1:
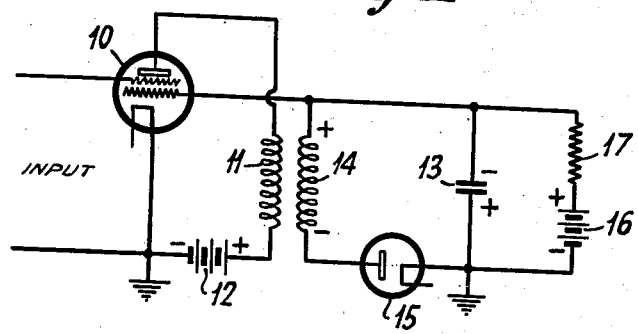
Figure 2:
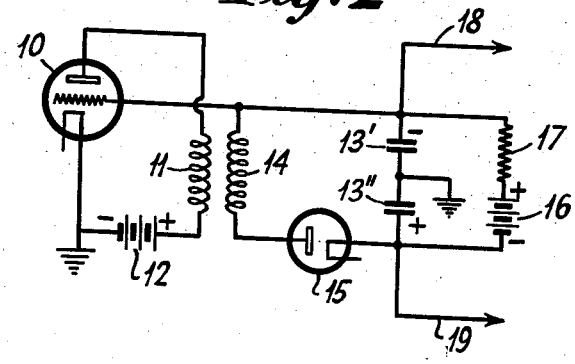
Figure 3:
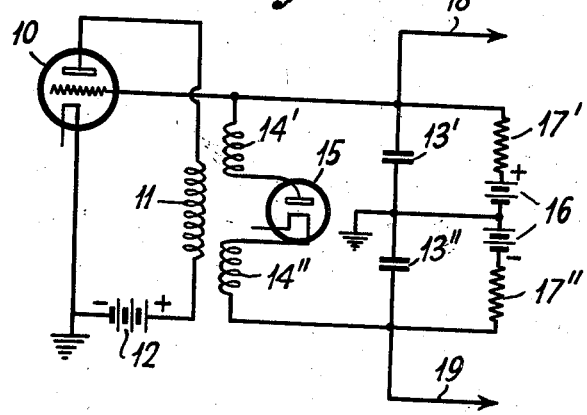

In the accompanying drawing, Fig. 1 illustrates the prior art and Figs. 2 and 3 show two modifications of my invention.

Referring to Fig. 1, 10 denotes an amplifier tube, 11 is the primary winding of a transformer included in the plate circuit thereof, while 12 is a plate potential source of supply. The grid circuit of tube 10 contains a parallel resonance circuit comprising the condenser 13 and a choke-coil 14 which at the same time represents the secondary winding of the said transformer. In series with the coil is connected a rectifier 15, and in parallel relation to the condenser 13 is a source of D. C. voltage supply 16 as well as a resistance 17.

The operation of the arrangement according to Fig. 1 is explained most simply by starting from the assumption that at the condenser 13 there prevails a charge in the sense of the indicated plus and minus signs, the said charge being of such a size that the tube 10 is biased to a point below the bottom bend of its plate current grid voltage characteristic. The source of D. C. voltage supply 16 will then charge the condenser 13 through the resistance 17 in such a way that the potential prevailing at the same is diminished. This process proceeds unchanged beyond the instant when flow of plate current in the tube 10 is initiated. If the assumption be made that, prior to the time when the voltage at the condenser 13 goes beyond the zero value, an impulse tending to reduce the plate current of tube 10 is fed to the circuit organization from the outside (and this, for instance, could be effected at an additional control grid of the tube 10), and if the further supposition be made that by the action and virtue of the said impulse, the plate current of the tube is briefly caused to decline, then the voltage at the secondary winding 14, which, during the time of rise of the plate current, had a direction negative toward the grid as indicated by the legended plus and minus signs, will be reversed and as a consequence the rectifier is rendered conducting. All that is necessary in this connection is that the size of the potential which arises at the winding 14 still surpasses the residual potential prevailing still at the condenser 13. Now, through the rectifier 15 the aggregate magnetic energy of the coil 11 will be discharged and this will cause re-charging of the condenser 13 to a high potential of a sense as indicated by the sign in the drawing; and this re-establishes the state considered at the outset. The operation of the arrangement will not be changed in any essential way if the voltage at the condenser 13 is allowed to rise to values which have a sign opposite that of the initial voltage value. The circuit organization, as a matter of fact, will then be capable of kipping or reversing, under certain circumstances, without an outside impulse being fed to it, inasmuch as the rectifier 15 is rendered conducting when the voltage at the condenser surpasses the blocking potential arising across the coil 14 and which is constant during the linear rise of the plate current of tube 10. However, if this is desired, a resistance could be inserted in the grid lead of tube 10. This has the result that after initiation of flow of grid current, in other words, from the point where the potential at condenser 13 is of zero value, the plate current of the tube 10 no longer rises so that the blocking potential at the coil 14 disappears.

The voltage feedback between the plate circuit and the grid circuit could be insured also by some ways and means other than by the aid of a transformer as shown in Fig. 1, say, by the aid of a reverser tube or a device characterized by a negative slope, or other equivalent means adapted to establish phase relations as described by reference to Fig. 1 between the plate potential of tube 10 and the blocking potential for the rectifier.

In a circuit organization of the kind illustrated in Fig. 1, according to the invention, the condenser is replaced by two series-connected condensers, while the junction or midpoint thereof is connected to a fixed potential.

An exemplified embodiment of the invention which comprises a condenser connection as stated is shown in Fig. 2. It will be seen that the single condenser 13 in Fig. 1 is replaced by the two condensers 13' and 13''. As to the rest, the circuit arrangement in all details is the same as in Fig. 1. In the arrangement of Fig. 2, a symmetric sawtooth wave is delivered across the leads 18, 19. But this wave will still contain a D. C. voltage component unless the two crest values of the aggregate condenser voltage are equidistant from zero condenser voltage. However, the said D. C. component may be eliminated at all events by means of establishing a capacitive coupling relation with the consuming or load device using the symmetric sawtooth voltage wave.

In the exemplified embodiment Fig. 3, the secondary winding 14 is divided into two distinct windings 14' and 14'' between which is interposed a rectifier 15. Also the resistance 17 connected in parallel relation to the two condensers 13' and 13'' is split into two resistances 17' and 17'' between which is inserted a source of D. C. voltage supply 16 the midpoint of which is connected with a fixed potential. In the circuit organization Fig. 3, such lack of symmetry as prevailed in the arrangement Fig. 2 is largely avoided, and as a result a symmetric sawtooth voltage wave, with due consideration of all distributed capacitances and the like, may be delivered across the terminals of leads 18 and 19.

What I claim is:

1. A sawtooth wave oscillator comprising a thermionic vacuum tube having anode, cathode, and at least one control electrode, a pair of electromagnetic energy storage means, a uni-directional conductor connected serially with and between said electromagnetic energy storage means, said electromagnetic energy storage means being connected in a current carrying electrode-cathode circuit of said thermionic tube, means for feeding back a portion of the energy in said electromagnetic energy storage means to another of the electrodes of said tube, a pair of capacitive members connected substantially in parallel with said electromagnetic energy storage means and said uni-directional conductor, means for maintaining the common terminal of said capacity means at a fixed reference potential, and means for storing energy in said electromagnetic energy storage means.

2. A sawtooth wave generator comprising a thermionic tube having an anode, a cathode and at least one control electrode, a pair of condensers serially connected, the common terminal of said condenser being directly joined to a point of reference potential, a source of substantially steady potential connected across said condensers, a uni-directional conductor and inductive means in series, said uni-directional conductor and said inductive means being shunted across both of said condensers, and an inductive member connected in the anode-cathode path of said thermionic tube, said latter inductive member being coupled to said first mentioned inductive member and means for connecting one of said condensers between said cathode and said control electrode.

3. A sawtooth wave generator comprising a thermionic tube having an anode, a cathode and at least one control electrode, a pair of condensers serially connected, the common terminal of said condensers being directly joined to a point of reference potential, a source of substantially steady potential connected across said condensers, a uni-directional conductor and inductive means in series, said uni-directional conductor and said inductive means being shunted across both of said condensers, means for connecting one of said condensers between said control electrode and said cathode and means connected in the anode-cathode path of said thermionic tube for feeding a portion of the energy in the anode-cathode path back to the control electrode-cathode path of said tube.

RUDOLF URTEL.